United States Patent [19]

Roy

[11] Patent Number: 6,086,756
[45] Date of Patent: Jul. 11, 2000

[54] GROSS POLLUTION FILTER

[75] Inventor: Scott Wade Roy, Hawthorndene, Australia

[73] Assignee: Ecosol PTY LTD, South Australia, Australia

[21] Appl. No.: 09/284,938

[22] PCT Filed: Oct. 23, 1997

[86] PCT No.: PCT/AU97/00710

§ 371 Date: Apr. 22, 1999

§ 102(e) Date: Apr. 22, 1999

[87] PCT Pub. No.: WO98/17875

PCT Pub. Date: Apr. 30, 1998

[30] Foreign Application Priority Data

| Oct. 23, 1996 | [AU] | Australia | PO 3127 |
| Dec. 2, 1996 | [AU] | Australia | PO 3941 |
| Dec. 10, 1996 | [AU] | Australia | PO 4080 |
| Jan. 29, 1997 | [AU] | Australia | PO 4821 |
| Feb. 13, 1997 | [AU] | Australia | PO 5086 |
| Mar. 13, 1997 | [AU] | Australia | PO 5615 |
| Aug. 15, 1997 | [AU] | Australia | PO 8607 |
| Sep. 24, 1997 | [AU] | Australia | PO 9381 |

[51] Int. Cl.⁷ ............................................. B01D 29/35
[52] U.S. Cl. ..................... 210/155; 210/162; 210/170; 210/434
[58] Field of Search ................... 210/154, 155, 210/162, 170, 254, 433.1, 434

[56] References Cited

U.S. PATENT DOCUMENTS 1,903,774  4/1933  Burrell .
5,498,331  3/1996  Monteith .................. 210/170
5,531,888  7/1996  Geiger et al. ............ 210/162
5,746,911  5/1998  Pank ....................... 210/170
5,779,888  7/1998  Bennett ................... 210/170
5,788,848  8/1998  Blanche et al. ......... 210/162
5,904,842  5/1999  Billins et al. ............ 210/434

FOREIGN PATENT DOCUMENTS

14930/97  5/1997  Australia .
71786/96  5/1997  Australia .

*Primary Examiner*—Christopher Upton
*Attorney, Agent, or Firm*—Klauber & Jackson

[57] ABSTRACT

A water filter arrangement (10) for trapping gross pollutants flowing in a storm water system is provided in-line or at end-of-line of a storm water pipe. The arrangement comprises an inlet (14) and an inlet area (18) which directs incoming water (16) into a filter (20). The filter traps entrained gross pollutants and filtered water exits the filter via filter outlet (50). The outlet (50) and surrounding walls (58 and 57) are shaped to create a flow of filtered water which forms a water barrier which restrains the flow of water and gross pollutants from the inlet (14) to the outlet (52). The water barrier is located between the inlet (14) and the outlet (52) preferably closer to the outlet than the inlet. As the filter (20) becomes full and the flow of filtered water exiting the filter decreases the water barrier subsides. When the filter is completely blocked, the water barrier completely subsides and the incoming water and gross pollutants by-pass the filter (20) and flow unrestrained without head loss from the inlet (14) to the outlet (52).

16 Claims, 4 Drawing Sheets

GROSS POLLUTION FILTER

This invention relates to a gross pollution filter apparatus for use in a water drainage system and in particular to a filter for capturing gross pollution along or at a termination point of a storm water drainage system.

BACKGROUND

Water quality degradation is a problem of growing proportions. One measure of water quality is the amount of gross pollution that is carried from our roads and streets into our storm water system and eventually into the reservoirs that we rely on for potable water. Our rivers, lakes, dams and ultimately the ocean are becoming the repository for gross pollution which is lowering the quality of those very important water sources.

Gross pollution in the main (90%) comprises organic matter like branches, twigs, leaves, and soil, the remainder being non-organic matter like plastic containers, bags, wrappers; paper; cans; and cigarette butts.

In one example of a storm water drainage system, storm water collected from metropolitan and township road surfaces and household roofs ends up in the underground storm water drainage system. Ground level storm water entry points called gully traps let a variety of various sizes of gross pollution into the storm water drainage system. Typical drainage systems comprise underground pipes and sometimes exposed water conduits, which carry storm water to holding reservoirs, rivers and ocean outflows.

Gross pollution is likely to accumulate in large quantities at the outflows of drainage systems and concern about the environmental impact of high concentrations of this gross pollution is justified.

Filtering of storm water using current techniques is a costly and time consuming undertaking and it is not unusual for water authorities to prefer to address the problem by cleaning up the very visible consequences of gross pollution which emits from the drainage system rather than actually reducing the contamination of the storm water system at its source. Sometimes gross pollution or filtering is undertaken at intermediate points along the drainage system but the typical approach is to install end of line grates which tend to quickly foul up and require constant maintenance and which do not deal with oil and oil like contaminates.

Similar considerations also apply to the treatment of polluted industrial water.

Some of the less than desirable features of prior and current storm water and gross pollution filters include:

- use of many metal parts which require anti-rusting treatment or use of expensive stainless steel elements
- moving parts which require maintenance and periodic replacement, and which are liable to jam, corrode and require frequent cleaning to maintain their efficiency
- use of large areas adjacent the existing drainage system for providing settling reservoirs which are sometimes many times wider than the drains and conduits with which they are associated
- high hydraulic head loss between the inlet and outlet resulting in low filter efficiency at low and high flow rates and great disruption to the drainage layout providing unwanted restrictions and prohibitions to the retrofitting of such filters to existing drainage systems
- small time intervals between pollution collection are required when many small gross pollution filters are incorporated into the drainage system and further, existing shapes of pollutant collection volumes are often difficult to empty and clean
- in-line grate type filters for different types of pollutants require large areas to handle the some time large volumes of gross pollutants and which have a large potential for blockage as well as often requiring the manufacture of unique elements at greater cost than desirable
- different efficiency at different flow rates, and often the poorest efficiency occurs at both low and high flow rates
- blockages caused particularly by sediment build up at the inlet and outlet of the filter apparatus and the accumulation of certain types of pollutants can be a health hazard and cause unnecessary use of overflow routes which bypass the filter apparatus
- prior arrangements also include apertured and solid weirs which induce a back pressure along the incoming storm water pipe during and certainly after the filter arrangement becomes inefficient and unable to adequately filter the flow of incoming storm water carrying gross pollutants.

These and other problems are reduced or eliminated by the invention disclosed herein.

BRIEF DESCRIPTION OF THE INVENTION

In its broadest form a gross pollution filter apparatus for use in water drainage systems carrying water and gross pollution, the apparatus comprising an inlet, an outlet lower than said inlet, a water filter means forming a holding chamber means for retaining a portion of the gross pollution, the filter means being located below the level of the inlet, and, having a water filter means outlet located at a level between said inlet and said outlet arranged so that filtered water flowing out the water filter outlet creates a water barrier to the flow of water and gross pollution between the inlet and the outlet.

In a further aspect of the invention the water barrier subsides when the flow of water through the filter means decreases such that water and gross pollution passes more easily from the inlet to the outlet than from the inlet into the filter means.

In a further aspect of the invention the water barrier is located adjacent the outlet.

Embodiments of the invention will now be described in some further detail with reference to and as illustrated in the accompanying figures. These embodiments are illustrative and not meant to be restrictive of the scope of the invention.

Figure 1:
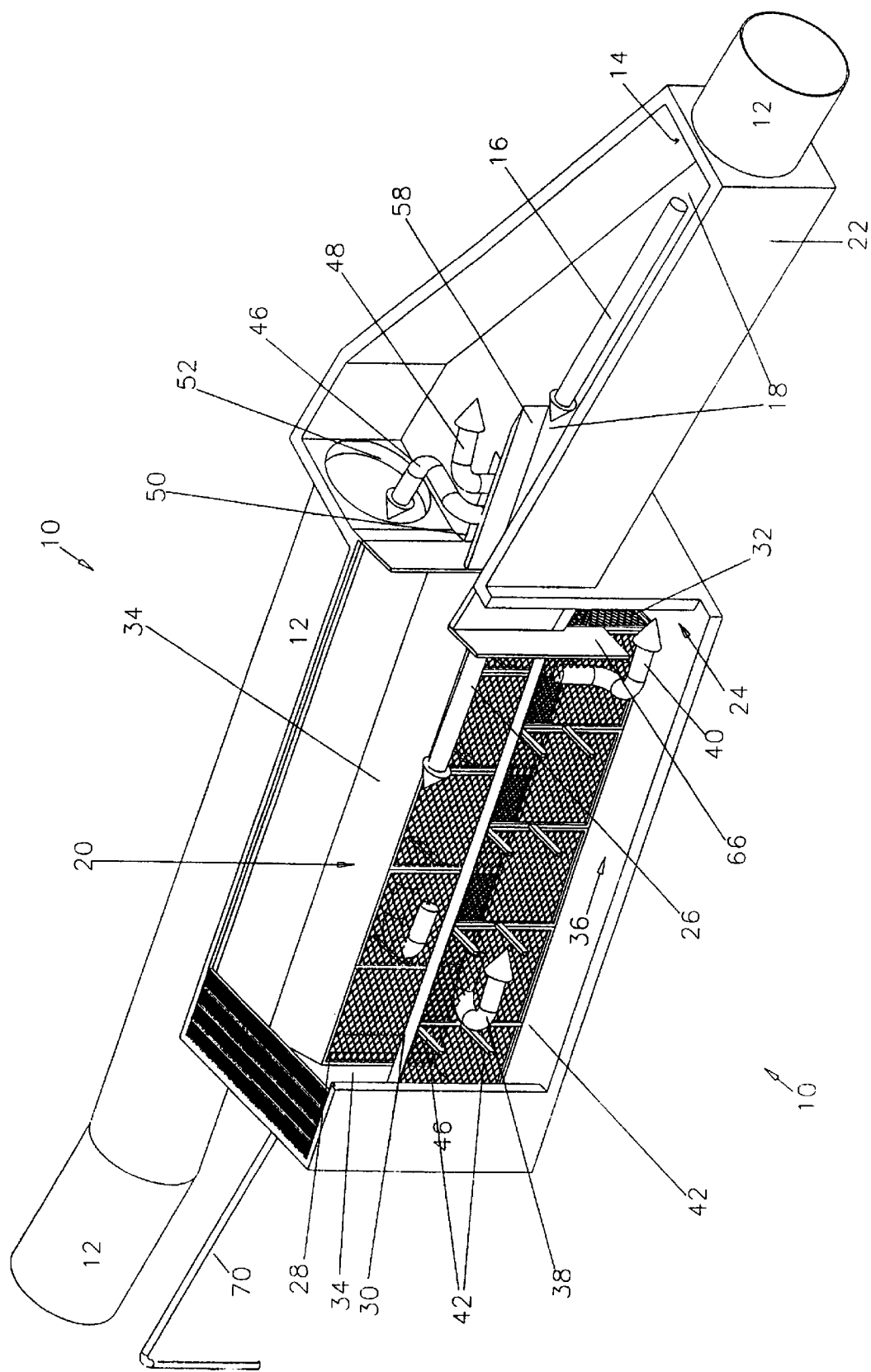
FIG. 1 depicts a perspective view of a longitudinal partial breakaway of an embodiment of an in-line filter apparatus of the invention in place along a drainage system pipe.

The gross pollution filter apparatus 10 of this embodiment is located along a storm water pipework 12 and is arranged to intercept a flow of storm water flowing along the pipework which may be entrained with gross pollutants.

The filter apparatus will continue to intercept gross pollutants until it becomes totally blocked at which time it is arranged to allow the flow of water and its entrained gross pollutants between its inlet and outlet.

The inlet 14 of the filter apparatus accommodates a storm water pipe 12 from which water and gross pollutants 16 pass over onto inlet area 18 which has a slight slope toward a water filter means 20.

Figure 2:
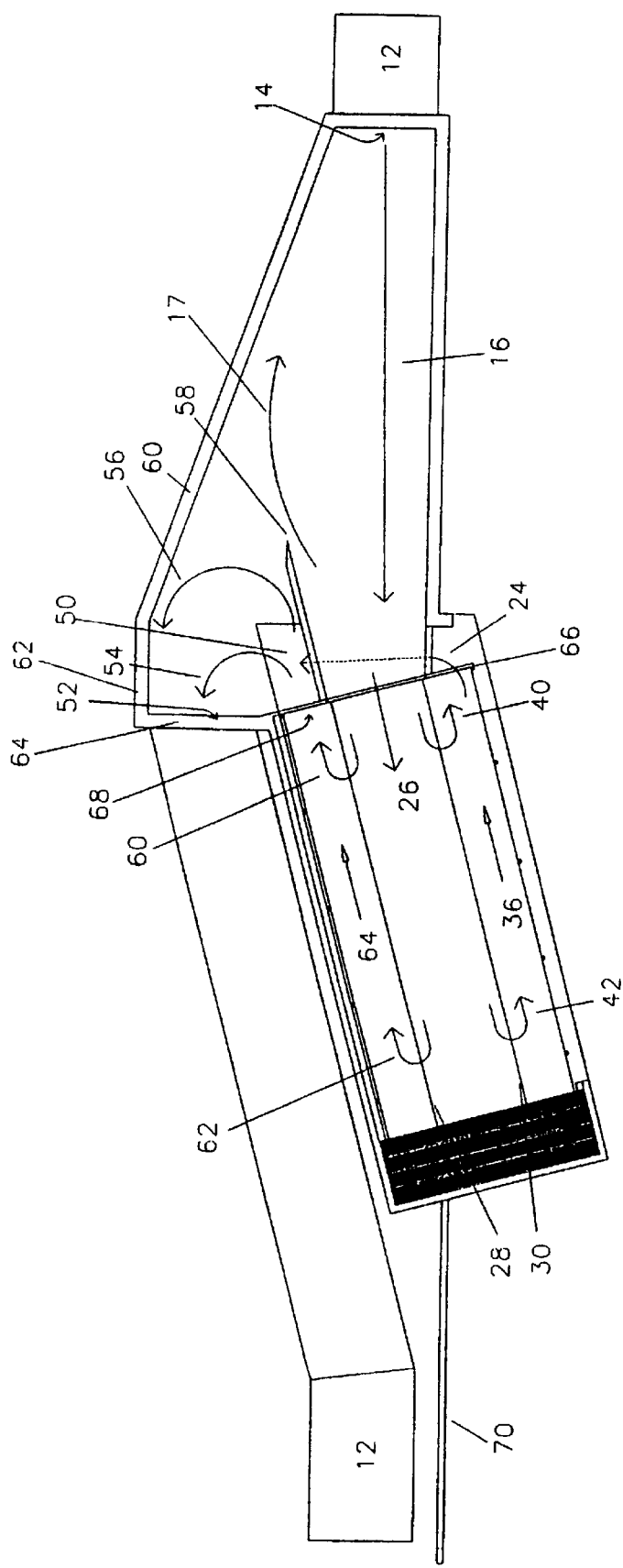
FIG. 2 depicts a top perspective view of the filter apparatus of FIG. 1.

Incoming water and gross pollutants are arranged to initially follow a straight path over the inlet area 18 or run adjacent to a side wall 22. Flow path 17 also occurs during operation of the filter as depicted in FIG. 2. This flow path is small in comparison to the main flow path 16 but results from the small amount of back pressure at the inlet to the water filter 20 and eventually is drawn back into the main flow path 16 without migrating to the outlet of the filter apparatus.

The inlet area 18 also extends (not shown in FIG. 1 but illustrated in FIG. 2) over a filtered water path 24 which will be described in greater detail later in the specification. Incoming water and gross pollutants 16 are shown as flow path 26 when they enter the water filter 20. The water filter 20 is located so as to receive the direct flow of water and gross pollutants from the storm water pipework and comprises an elongate chamber formed with two longitudinal substantially vertical walls of filter elements 28 and 30. The filter means also comprises a front lateral substantially vertical wall of filter element 32 as well as a rear lateral substantially vertical wall of impervious material 34 such as concrete.

The water filter elements 28, 30 and 32 are preferably stainless steel mesh or alternatively may be galvanised mesh having aperture sizes suitable for restricting the passage of a predetermined size of gross pollutant.

The water filter 20 depicted is a preferable shape and is sized to accommodate a predetermined amount of trapped gross pollutants. The exact quantity deemed sufficient may depend on the desired frequency for emptying the filter as well as the expected amount of gross pollutants which is entrained in the storm water carried by a particular storm water pipe system.

The water filter 20 becomes a repository for collected gross pollution and should be sized by depth so that it can be emptied with the means available to clean gross pollutants from that depth. For example, vacuum equipment will have an optimum depth at which it will work. Having determined the depth of filter means, the maximum volume of collected gross pollutants will be determined by its length but also by the desired flow capacity of the apertures of the filter elements. Small apertures in the filter elements will require longer or greater areas of filter element to ensure adequate flow of filtered water even though some proportion of the apertures will be blocked by gross pollution.

The shape of the filter means of this embodiment is rectangular, however, it could be tapered in width from the water filter inlet to the rear wall. Alternatively the water filter could be circular or it could comprise a number of cells one adjacent the other. These cells could be located below the filter elements and could have a variety of shapes.

Figure 3:
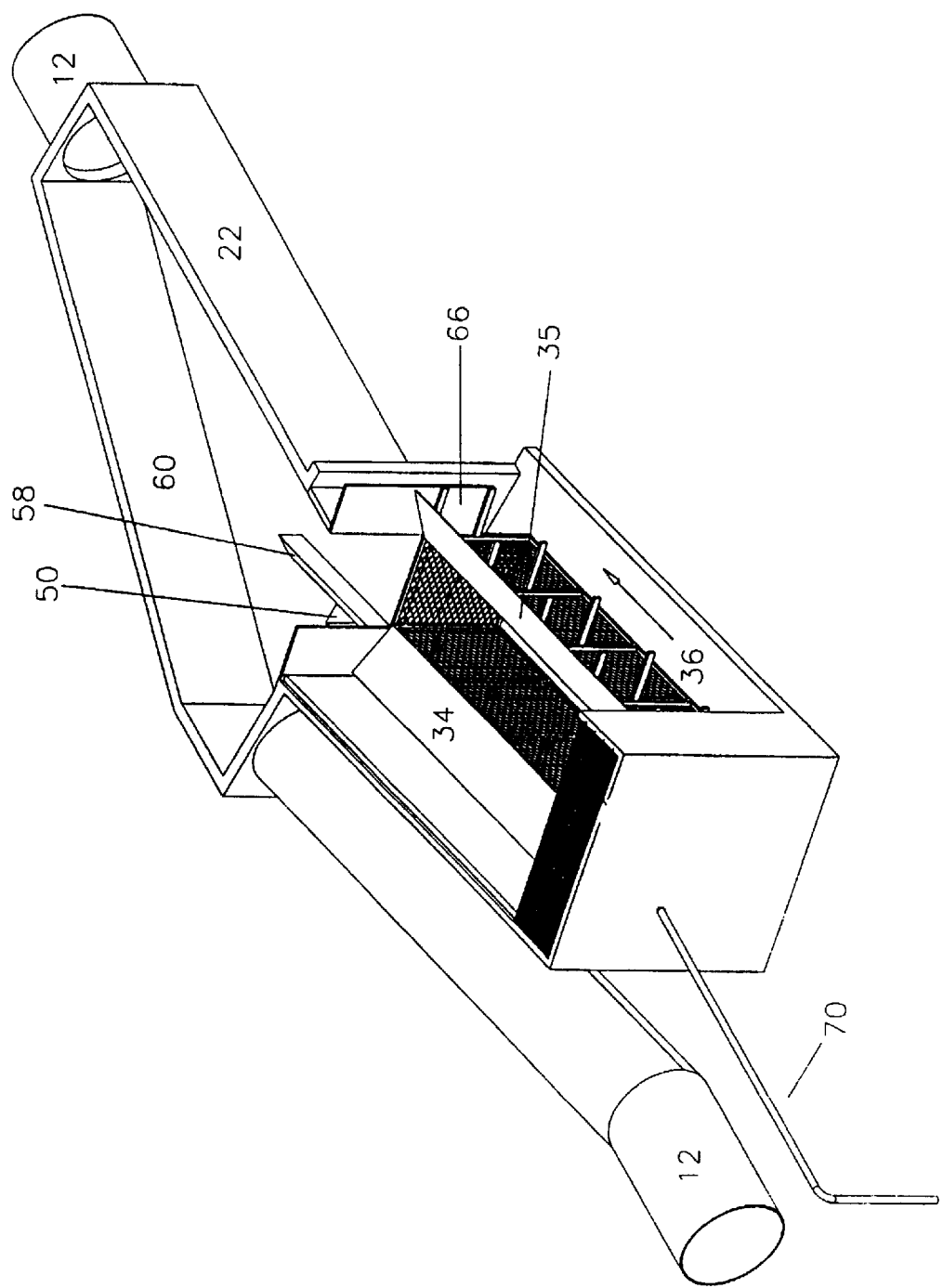
FIG. 3 depicts a perspective end view of a partial breakaway of the filter apparatus of FIG. 1.

It has been found that the majority of the contained gross pollution collects near the entry point to the filter means. Floating or buoyant gross pollution will eventually become rotted or water logged and sink to the bottom of the filter means. The sloped walls 34 and 35 (wall 34 is depicted in FIG. 1 and wall 35 is depicted in FIG. 3) are located above the maximum water level of the filter means. Wall 34 extends from the top of the filter element 28 across to the top of a channel located adjacent the filter element 28 and a wall (not shown). Sloped walls 34 and 35 keep floating gross pollution out of their respective adjacent channels until the pollution falls into the filter once high flow rates and associated turbulence have subsided.

The sloped walls also assist in keeping some of the incoming solid pollutants away from the filter elements thus providing a better filter flow condition during high flow rates.

It is a disadvantage to have the filter elements (as depicted in FIGS. 1 and 2) extend above the maximum water height in the filter means, since that portion above the maximum water height would soon become slicked up with pollutants and thereafter fail to act as a filter in any event.

Filtered water passes through the filter elements 28, 30 and 32 and into the adjacent channels. Channels 24 and 64 have been previously described while channel 36 lies adjacent filter element 30. Flow arrows 38 and 40 depict the flow of filtered water via channel 36 into channel 24.

The channels 24, 64 and 36 are all of sufficient volume to accommodate the maximum incoming flow rate.

Support members 42 (as shown in FIG. 1) are used to space the upright guide channels 44 of the filter element 30 from the wall 46 (not shown in this breakaway depiction of a filter apparatus).

Outflow from the filter means is depicted by flow arrows 46 and 48 which are merely pictorial representations of the flow path of filtered water once the filter means fills with water and water exits the filter means.

Water filter outlet 50 is located between the inlet 14 of the filter apparatus and the outlet 52 of the filter apparatus, the outlet 52 being lower than both the water filter outlet 50 and the inlet 14.

As is more clearly depicted in FIG. 2, the filtered water exiting the water filter outlet 50 takes a number of paths to the outlet 52. The path 54 being the most direct, while path 56 is more circuitous. The outlet 50 is shaped so as to encourage a circular flow path such as 56 as is pictorially depicted in FIG. 2.

Furthermore, barrier wall 58 and the boundary walls 60, 62 and 64 all contribute to the formation of a circular flow pattern of the filtered water exiting the water filter outlet 50. Furthermore, the pressure of the storm water 16 entering the filter apparatus via the inlet 14 acts beyond the end of the barrier wall 56 encouraging the flow path 54 to turn back towards the outlet 52.

The flow path 54 creates a water barrier to restrain the flow of water and gross pollution between the inlet 14 and the outlet 52.

It is preferable for the flow capacity of the water filter outlet 52 to be equal to or greater than the maximum flow capacity of the inlet 12.

FIG. 2 more clearly depicts preferable flow paths and also clearly shows the dual purpose of water barrier wall 56.

Water barrier wall 56 intercepts and directs the majority of initial and continuing flow 16 of incoming water and pollution into the filter means 20 because it protrudes onto outlet side of the line along the pipe system 12. Water barrier wall 56 also prevents filtered water exiting from the water filter outlet 50 mixing immediately with incoming water and pollutants. It is preferable for the distance between the end of the barrier 56 and the nearest wall 60 combined with the height of the channel between the inlet 14 and the outlet 52 to be equal to or greater than the maximum flow volume of the inlet 14 so that in a full by-pass condition the fact that the filter means is full does not create any blockage in the pipework system.

FIG. 2 also depicts the original storm water pipeline 12-12 as being merely interposed by the filter assembly 10 without requiring realignment of the original pipeline path either in direction or grade. This allows for retrofitting of a filter arrangement into an existing pipe system.

Flow path 26 is the continuation of incoming flow path 16 within the filter means. Flow within the filter means can be vigorous and turbulent during high flow rates and most all the gross pollution will be entrained within the filter means 20. However, smaller particles, suspended particles and of course dissolved pollutants move through the filter members 28, 30 and 32 as depicted in FIG. 2. The flow paths associated with filter member 30 are shown as arrows 40 and 42 into channel 36 and those associated with filter member 30 are shown as flow arrows 60 and 62 into channel 64.

Both channels 36 and 64 are quieter regions of the filter means and some of the smaller and suspended particles are able to settle to the bottom of the channel ready for extraction when the filter apparatus is cleaned out.

Channels 36, 64 and 24 are the last water communication paths of the filter means before reaching the filter outlet 50. Although, not preferable, a further channel could be created to the rear of the filter means this additional channel is not necessary for adequate operation of the filter arrangement.

The width of each channel in combination with its depth is preferably capable of sustaining a flow volume equal to the maximum flow volume of the input 14 so as to ensure that filtered water has minimum resistance to flow towards the filter outlet 50.

Figure 4:
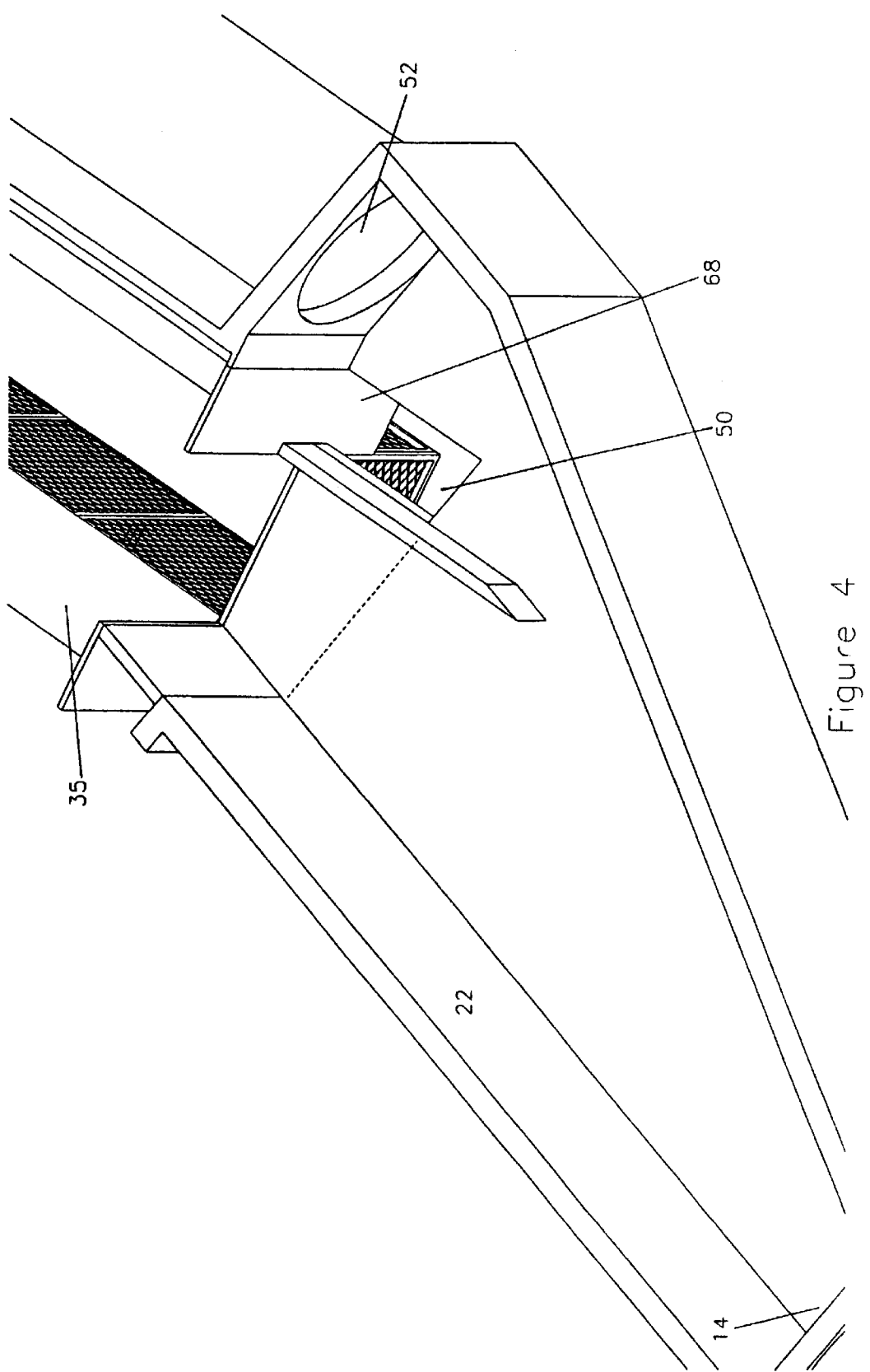
FIG. 4 depicts a partial perspective end view of the filter apparatus of FIG. 1.

Preferably, channels 36, 64 and 24 are arranged to have one or more baffles 66 and 68 (as depicted in FIGS. 2, 3 and 4) so as to restrict the flow of floating pollutants such as oil, grease etc, across the top of the filtered water and thereby prevent it from entering the filter output 50 and then into the apparatus outlet 52.

These baffles 66 and 68 are located in the front top regions of the channels 36 and 64 respectively and will work if the water level in the filter means is kept up to the outlet level of the filter means. The volume below the baffles should also preferably be sufficient to allow the maximum flow rate of the inlet 14 to pass therethrough thereby continuing the ability for the filter means to work at maximum flow rates.

The use of baffles is only preferable since sometimes the filter arrangement will suffice to filter solid and some suspended pollutants with little concern for oil and grease since that may be a small constituent of the incoming gross pollution.

A siphon tube 70 as depicted in FIGS. 1, 2 and 3 is an optional element of the filter arrangement of the invention. Siphoning is sometimes required to remove still water from the filter means which could otherwise become a breeding area for mosquitos and other insects, as well as decaying matter which could become a health hazard.

In high flow rate circumstances the majority of incoming water and pollutants are restrained by the filter means 20 and the flow of filtered water exits the filter outlet 50 and then leaves the filter apparatus through its outlet 52. The water barrier created during this high flow circumstance keeps the incoming water and pollution separate from the filtered outgoing water.

However, it has been found that this is also the case for low flow rate situations and the water barrier is equally effective.

The hydraulic loss of the filter arrangement at both high and low flow rates is very similar but account is required of the small head loss created by the additional turbulence created by the water barrier arrangement.

There is however a very great advantage of the filter arrangement of the invention when the filter means becomes clogged with gross pollutants. As the resistance of water flowing through the filter member becomes greater its consequence is to reduce the effectiveness of the water barrier and thus make it easier for incoming water and pollutants to flow directly to the outlet from the inlet, and when this flow path is used there is little or no head loss during this filter by-pass operation.

This characteristic is in stark contrast to other filter arrangements for example weirs, which when they become blocked require the incoming water to overflow the blocked weir causing maximum head loss during the overflow condition and which also encourages gross pollution to back up into the feeding pipework system. This situation remains until the weir is cleared of gross pollution.

Clearly, the filter arrangement of the invention avoids this and ensures that during by-pass conditions the flow properties of the pipework system are not degraded in any substantial way.

The embodiment of the filter arrangement of the invention disclosed in this specification is also arranged to minimise areas of dead water, but other variations of the embodiment may also exist to achieve the aims of the invention while also being able to minimise dead water regions.

In this embodiment of the filter arrangement there is only one filter means exit located so as to maximise the amount and location of filtered water to create a water barrier. There are however other possible arrangements which could provide for more than one filter means exit and more than one water barrier while still achieving the aims of the invention.

The materials used to construct the embodiment of the filter arrangement of this invention are primarily concrete and perforated stainless steel sheeting. However, different applications such as in chemical factories may require use of lighter materials such as plastics and aluminium or which may have special characteristics for use with certain chemicals.

Perforated stainless steel sheets are the preferred filter element material since they may be easily cut to size and are readily replaceable. Furthermore, a variety of standard perforated stainless steel sheets having not only a variety of sizes but a variety of aperture sizes are readily available thus making the choice of aperture size a matter of what minimum size of pollutants is designed to be filtered, while ensuring that total aperture volume provided in each of the sheets is great enough to accommodate the anticipated flow rates.

It is preferable that there be a smooth transition between the pipe 12 into the filter apparatus at its inlet 14 and also at the outlet 52 of the filter apparatus. Likewise it is preferable for there to be a clean transition from the filter means outlet 50 to the path between the inlet 14 and the outlet 52 of the filter apparatus.

It is also preferable for all of the upper surfaces of the filter apparatus to be capped with removable covers. This provides for safety and an allowance for access for cleaning and maintenance.

It will be noted that the overflow condition provides a flow path which is self cleaning and is the same grade as the existing pipework, therefore ensuring no buildup at either the entrance or the exit of the filter apparatus of gross pollutants and a maintenance of hydraulic flow characteristics of the existing water pipe system.

It will be appreciated by those skilled in the art, that the invention is not restricted in its use to the particular application described, nor is it restricted to the feature of the preferred embodiment described herein. It will be appreciated that various modifications can be made without departing from the principles of the invention, therefore, the invention should be understood to include all such modifications within its scope.

What is claimed is:

1. A gross pollution filter apparatus for use in water drainage systems carrying water and gross pollution said apparatus comprising an inlet, an outlet lower than said inlet, a water filter means forming a holding chamber means for retaining a portion of said gross pollution, said filter means located below the level of said inlet, and, a water filter means outlet located at a level between said inlet and said outlet arranged so that filtered water flowing out said water filter outlet creates a water barrier to the flow of water and gross pollution between said inlet and said outlet.

2. A gross pollution filter apparatus according to claim 1 wherein said water barrier subsides when the flow of water through said filter means decreases such that water and gross pollution passes more easily from said inlet to said outlet than from said inlet into said filter means.

3. A gross pollution filter apparatus according to claim 1 wherein said water barrier is located adjacent said outlet.

4. A gross pollution filter apparatus according to claim 1 wherein said filter means is located in the existing line and flow grade of said drainage system.

5. A gross pollution filter apparatus according to claim 1 wherein said filter means comprises vertical filter elements reaching from the bottom of said filter means volume to the level of said water filter output providing water communication between said inlet and said water filter outlet.

6. A gross pollution filter apparatus according to claim 5 wherein one or more of said filter elements are removable for replacement or cleaning.

7. A gross pollution filter apparatus according to claim 1 further comprising a stilling volume located in the fluid communication path between said filter means and said filter means outlet.

8. A gross pollution filter apparatus according to claim 7 wherein said stilling volume adjacent said filter means has at least one baffle located therein so as to restrict the flow of floating pollutants to said filter means outlet being those pollutants which have not been retained within said filter.

9. A gross pollution filter apparatus according to claim 1 wherein the flow capacity of said filter means outlet is at least equal to the flow capacity of said inlet flow capacity.

10. A gross pollution filter apparatus according to claim 1 wherein the volume of storm water entering said filter means from said inlet is restricted by a restriction means.

11. A gross pollution filter apparatus according to claim 10 wherein said restriction means comprises a tapered cavity formed partially by an inlet area and side wall members and a lid member resting upon said side wall members.

12. A gross pollution filter apparatus according to claim 1 further comprising a siphon means located between said filter means and the exterior of said apparatus for siphoning water from said filter means.

13. A gross pollution filter apparatus according to claim 1 wherein said filter means has a removable top member to allow for access to said filter means for cleaning and maintenance.

14. A gross pollution filter apparatus according to claim 1 wherein said inlet is located so as to provide a water and gross pollutant path adjacent a director means into said filter means.

15. A gross pollution filter apparatus according to claim 14 wherein said inlet water and gross pollutant path are located adjacent a wall.

16. A gross pollution filter apparatus according to claim 14 wherein each said water path has a flow volume of at least the flow volume of said inlet.

* * * * *